United States Patent
Lakhotia et al.

(10) Patent No.: US 7,707,040 B2
(45) Date of Patent: Apr. 27, 2010

(54) METHOD OF GENERATING BUSINESS INTELLIGENCE INCORPORATED BUSINESS PROCESS ACTIVITY FORMS

(75) Inventors: Jeetu Lakhotia, Saratoga, CA (US); Christopher Dziekan, Manotick (CA); Chris Massey, Four Marks (GB); Tim Harmon, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 11/473,596

(22) Filed: Jun. 23, 2006

(65) Prior Publication Data

US 2007/0061283 A1 Mar. 15, 2007

(30) Foreign Application Priority Data

Jun. 30, 2005 (CA) .................................. 2511196

(51) Int. Cl.
*G06Q 10/00* (2006.01)
(52) U.S. Cl. ........................................... 705/1; 707/500
(58) Field of Classification Search ...................... 705/1
See application file for complete search history.

(56) References Cited

U.S. PATENT DOCUMENTS

| | | | | |
|---|---|---|---|---|
| 6,470,464 | B2 * | 10/2002 | Bertram et al. | 714/37 |
| 6,499,041 | B1 * | 12/2002 | Breslau et al. | 715/210 |
| 6,567,789 | B1 * | 5/2003 | Baker | 705/31 |
| 6,637,020 | B1 * | 10/2003 | Hammond | 717/107 |
| 6,850,950 | B1 * | 2/2005 | Clarke et al. | 707/102 |
| 2001/0054046 | A1 * | 12/2001 | Mikhailov et al. | 707/500 |
| 2002/0065701 | A1 * | 5/2002 | Kim et al. | 705/9 |
| 2003/0101070 | A1 * | 5/2003 | Mahosky et al. | 705/1 |
| 2005/0080756 | A1 * | 4/2005 | Hitchcock et al. | 707/1 |

* cited by examiner

*Primary Examiner*—John G Weiss
*Assistant Examiner*—Candice D Carter
(74) *Attorney, Agent, or Firm*—Patterson & Sheridan, LLP

(57) ABSTRACT

A business process management system provides one or more business intelligence (BI) gadgets, each providing a predefined functionality for extracting data from one or more data sources of an organization. The system allows embedment of one or more BI gadgets into a business process activity form for presenting to a user relevant data for a business process activity represented by the business process activity form.

26 Claims, 7 Drawing Sheets

FIG. 10

METHOD OF GENERATING BUSINESS INTELLIGENCE INCORPORATED BUSINESS PROCESS ACTIVITY FORMS

FIELD OF THE INVENTION

This invention relates to the field of managing business process, and more particularly to a Business Intelligence (BI) incorporated Business Process Management (BPM) system and method thereof.

BACKGROUND OF THE INVENTION

Business process management is describing business process activities which are performed to optimize a business process in an organization. A business process often involves access to information in one or more data sources of the organization. Business processes, as currently instantiated in business process management software, tend to be low-level operational in nature, i.e., the processes are rote and prescriptive, and executed by staff personnel. Management processes, on the other hand, are more ad hoc and near-real-time information-dependent.

Management participation in business processes is typically manual, e.g., verbal/written communications through email or voicemail. In cases where administrators want to include 'data' within an administrative form, such a form needs custom hand crafted data retrieval query using, e.g., structured query language (SQL).

Other existing solutions include sets of components that enable Java™ developers to quickly create custom solutions using Java Objects or Java Server Pages (JSPs). These can be tightly integrated with other applications or portals and by their nature involve writing and adapting programs.

Others have made the results of the Extract, Transform and Load (ETL) process more current, ensuring more up-to-date data is made available. However, this approach does not solve the problem of providing non-programmer users with suitable access to the data.

It is known to provide users with an indication that updating of the underlying database has taken place, thereby ensuring immediate results to multi-dimensional sophisticated queries for business process events occurring in near real time. However, there is no process of actually carrying out the queries and subsequent decision-making based on forms.

It is also known to provide analytics that give end users across an organization access to the information they need, directly in the context of their business processes so that these processes are more timely and up-to-date. This can be done by using a framework for guiding users through effective, repeatable decision-making processes. However, the processes so improved must be pre-defined and tend to involve interactions with many people or organizations. They do not address ad hoc or informal situations.

Business process systems are known where process activities and associated forms are provided in a computer-assisted environment. These systems require the users to provide all of the data deemed necessary to make decisions, thereby allowing room for error in inputting or transferring that data.

It is therefore desirable to provide a mechanism to overcome the latency of data, at the same time reducing errors in planning processes.

SUMMARY OF THE INVENTION

It is an object of the invention to provide an improved method and system that obviates or mitigates at least one of the disadvantages of existing systems.

The invention uses business intelligence (BI) gadgets to access data in data sources, e.g., for navigation, search, rendering and interaction. The BI gadgets are embeddable in business process activity forms.

In accordance with another aspect of the present invention, there is provided a method of generating business intelligence incorporated business process activity forms. The method comprises providing a set of business intelligence (BI) gadgets, each BI gadget providing a predefined functionality for extracting data from one or more data sources storing BI data of an organization; generating a business process activity form representing a business process activity in response to a request for the business process activity form; and embedding one or more of the BI gadgets automatically and dynamically into the business process activity form for allowing access to the predefined functionality of the embedded one or more of the BI gadgets from the business process activity form for navigating, searching, rendering or interacting with data in the one or more data sources.

In accordance with another aspect of the present invention, there is provided a computer readable medium storing instructions and/or statements for use in the execution in a computer of a method of managing business process using data from one or more data sources of an organization. The method comprises the steps of providing one or more business intelligence (BI) gadgets, each providing a predefined functionality for extracting data from the data sources; generating a business process activity form representing a business process activity; and embedding one or more of the BI gadgets into the business process activity form for allowing a user to access the functionality of the embedded BI gadgets from the business process activity form.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 10 is a diagram showing an example of a business process activity form.

DETAILED DESCRIPTION OF PREFERRED EMBODIMENTS

Embodiments of the invention may conveniently be implemented on any general purpose computing platform, including one incorporated in a client/server or networked environment, such as that described with reference to FIG. 1 in which one or more client computers 110, 111 are connected over a network 100 to a server 120, which is itself connected to one or more enterprise data sources 130.

Figure 2:
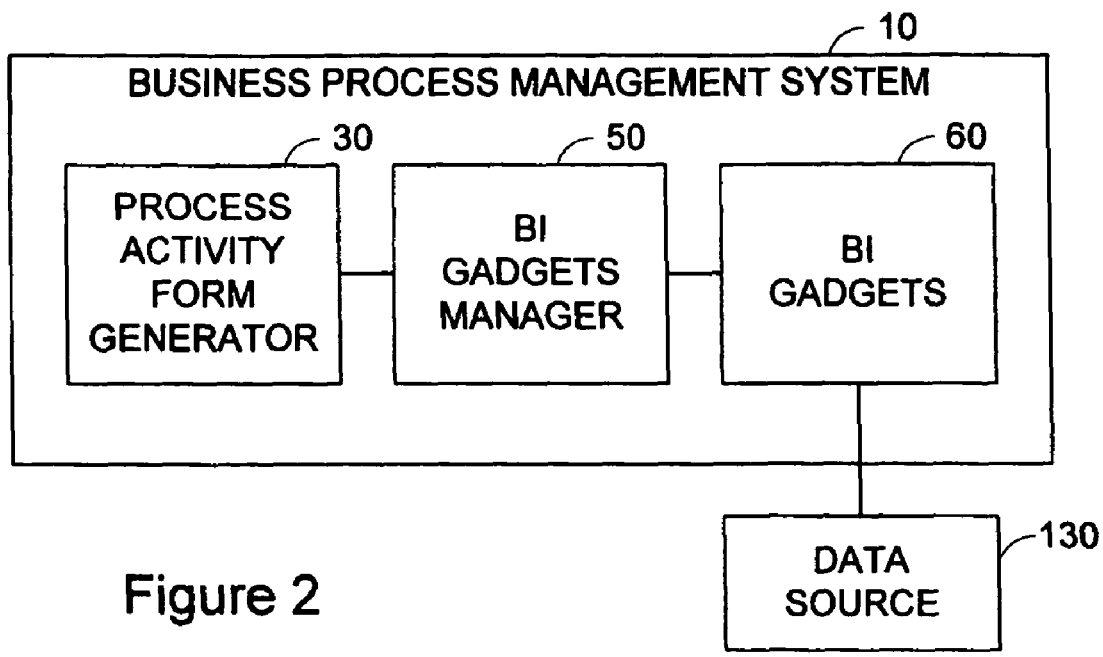
FIG. 2 is a block diagram showing a business process management system in accordance with an embodiment of the present invention.

FIG. 2 shows a business process management (BPM) system 10 in accordance with an embodiment of the invention. The BPM system 10 comprises a business process activity form generator 30, a BI gadget manager 50 and a set of BI gadgets 60.

The business process activity form generator 30 generates business process activity forms. Each business process activity form represents a business process activity. A business process activity form is a visible manifestation of data used in business process management. It provides data that is relevant for a business user to make a decision or recommendation in performing the business process activity. Business process activity forms are used by business users at run-time, such as a manager or other employee who uses the BPM system 10 and are typically not technically skilled. The business process activity forms assist such run-time users in making a decision or recommendation, as further described below.

Figure 3:
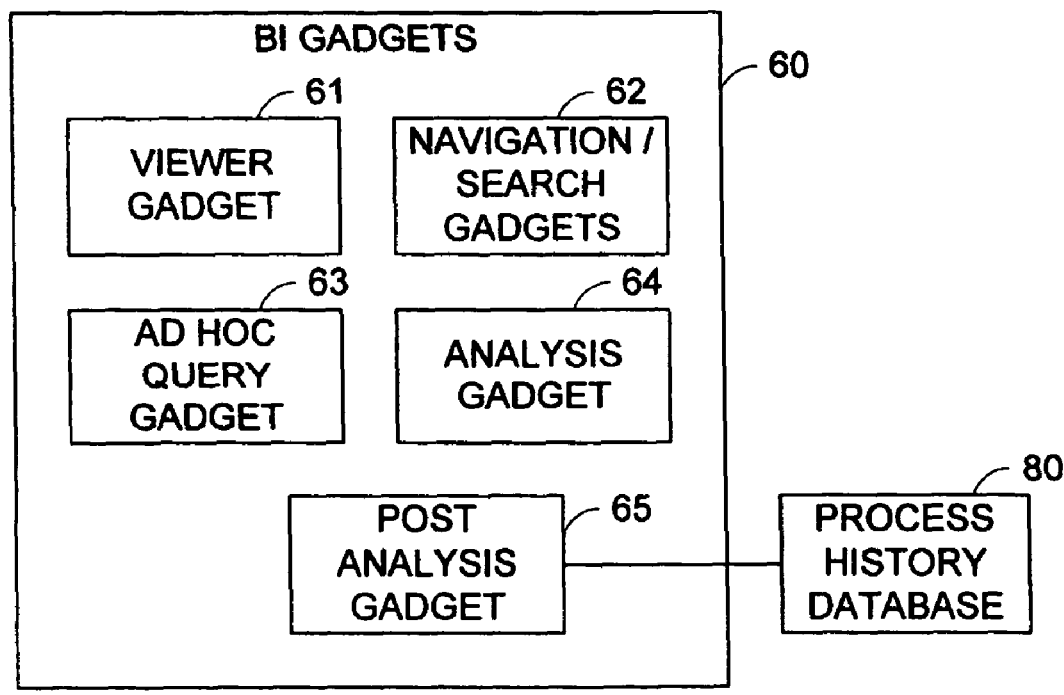
FIG. 3 is a block diagram showing an example of a set of BI gadgets.

A BI gadget 60 is a tool to extract data from one or more data sources 130. An organization, e.g., an enterprise or corporation, typically has one or more data sources 130, such as, a data warehouse, a transactional database, enterprise applications and/or other corporate data sources. BI gadgets 60 access data in the data sources 130 for navigation, search, rendering and interaction by run-time users. BI gadgets 60 are embeddable in business process activity forms. Examples of various BI gadgets 60 are described referring to FIG. 3 below.

The BI gadgets manager 50 presents the BI gadgets 60 to the business process activity form generator 30 to allow one or more BI gadgets 60 to be embedded in business process activity forms.

When a run-time user requests a business process activity form, the business process activity form generator 30 provides the requested business process activity form with relevant BI gadgets automatically and dynamically embedded in the requested form. An embedded BI gadget may take a form of data or a report containing data extracted from the data sources 130, a query to extract data from the data sources 130, and/or a search option for searching and/or navigating data in the data sources 130. The run-time user can use one or more desired BI gadgets within the business process activity form to obtain relevant information to complete the business process activity form. There is no need for the run-time business user to know how to locate and access relevant information. Also, there is no need for a designer or author of the business process activity form to write code within the forms for extracting data from the data sources 130.

A BI gadget 60 may be an application that can be embedded in a business process activity form. Examples of these BI gadgets 60 include Web Services for Remote Portlets (WSRP)-compliant portlets, and those based on HyperText Mark-up Language (HTML). The type of BI gadgets 60 may be determined depending on the capability of the relevant business process activity forms. WSRP is a web services protocol for aggregating content and interactive web applications from remote sources. A portlet is typically an area or component within a web page where data is exposed to the user, that data being derived from underlying data by processes that are not visible to the user. A portlet processes requests and generates dynamic content. The end-user sees a portlet as being specialized content within a web page that occupies a small window in that page. A portlet provides users with the capability to customize the content, appearance and position of the portlet. It provides a framework for sophisticated scenarios, including the ability for consumers to customize a portlet's content, and to create application process flows. WSRP builds on a few fundamental standards and allows for the implementation of evolving standards, to deliver a protocol rich in abstractions and operations. It functions as a toolkit for programmers.

Figures 1, 4:
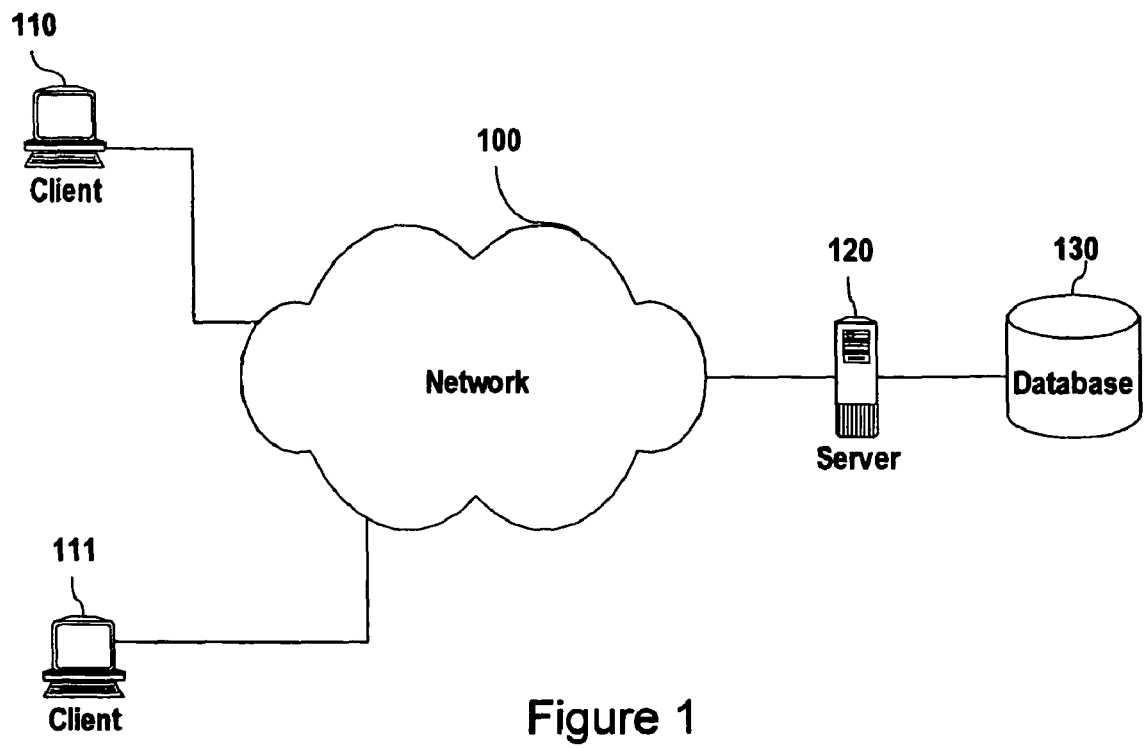
FIG. 1 is a diagram showing an example of a general-purpose computing environment in which embodiments of the invention may be practiced.
FIG. 4 is a diagram showing a very simple example of a business process activity form used in an embodiment of the invention.

FIG. 4 illustrates an example of a simple business process activity form having embedded BI gadgets. The form 300 has embedded in it four fields 310, 312, 314, 316 with or without their associated field labels. In this case, the first field 310 contains information supplied by the user, and no BI gadget is associated with that field 310. The second field 312 contains a value that is directly picked from one of the corporate data sources using an embedded BI gadget 60. The third field 314 contains data (or artifacts) derived from the data sources 130 using business intelligence tools through an embedded BI gadget 60. An artifact is data derived from the data sources 130 using business intelligence tools. The user can select from the artifacts using the scroll tool 315 or similar mechanisms commonly used in business and windowing computer applications. The fourth field 316 contains a report, in graphical format, based on data contained in the corporate data sources, again derived using business intelligence tools, and made available using an embedded BI gadget 60.

Figure 5:
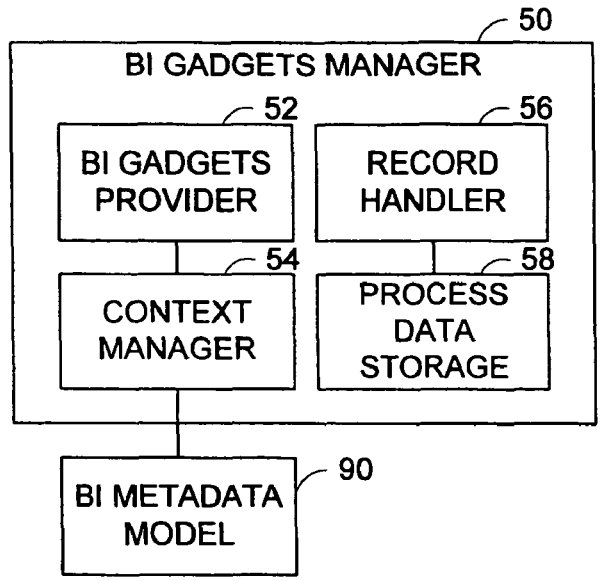
FIG. 5 is a block diagram showing a BI gadgets manager.
Figure 6:
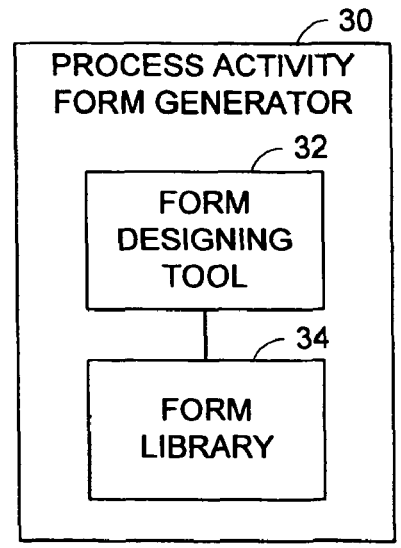
FIG. 6 is a block diagram showing a business process activity form generator.

FIG. 5 shows an embodiment of the BI gadgets manager 50. In this embodiment, the BI gadgets manager 50 has a BI gadgets provider 52 for exposing available BI gadgets 60 for the use by the business process activity form generator 30. As shown in FIG. 6, the business process activity form generator 30 may have a form designing tool 32 to assist a form designer or author to design business process activity forms. The form designing tool 32 may have a process design palette for presenting to the form author available tools that can be used in designing a business process activity form. In that case, the BI gadgets provider 52 may add available BI gadgets 60 to the process design palette for author's selection for embedding selected BI gadgets 60 in the business process activity form.

The BI gadgets manager 50 may have a context manager 54. Context may be data that was embedded to the business process activity form at design-time, data that was pre-populated in the business process activity form at run-time, or data that the user has entered into the business process activity form. Design-time is the period during which a business process activity form is developed, including the assignment of BI gadgets and other means to pre-fill fields. Run-time is a business real-time and the period during which a business process activity form is used.

The context manager 54 derives context from business process activity forms. The BI gadgets manager 50 makes the derived context available to the BI gadgets 60 to render BI content or extract data from the data sources 130.

The context manager 54 may use a BI metadata model 90 storing metadata describing business intelligence data in the data sources 130. The BI metadata model 90 may or may not be part of the BI gadgets manager 50 or the BPM system 10.

When the organization has an existing BI metadata model, the BI gadgets manager 50 may use metadata in such an existing BI metadata model.

The BI gadgets manager 50 may also have a business process data record handler 56 and a business process data storage 58. The business process data record handler 56 records in the business process data storage 58 relevant business process data, including BI data and contexts in business process activity forms, process paths taken, and actions, e.g., decisions or recommendations, taken within the business process activity forms. The BI gadgets manager 50 thus provides recording of decision making for future reference, process improvement and similar functions, and for audit and compliance purposes. This will form a knowledge database for the organization. The recorded business process data may also form an audit/compliance database. The business process data storage 58 may be a separate component. It may be part of other data storage of the computer system.

As shown in FIG. 6, the business process activity form generator 30 may have a form library 34 for storing business process activity forms predefined or defined by form authors. The business process activity form generator 30 may generate business process activity forms from the form library 34 and embed one or more appropriate BI gadgets 60 therein. These business process activity forms with embedded BI gadgets may be stored in the library 34 or other storage.

Figure 7:
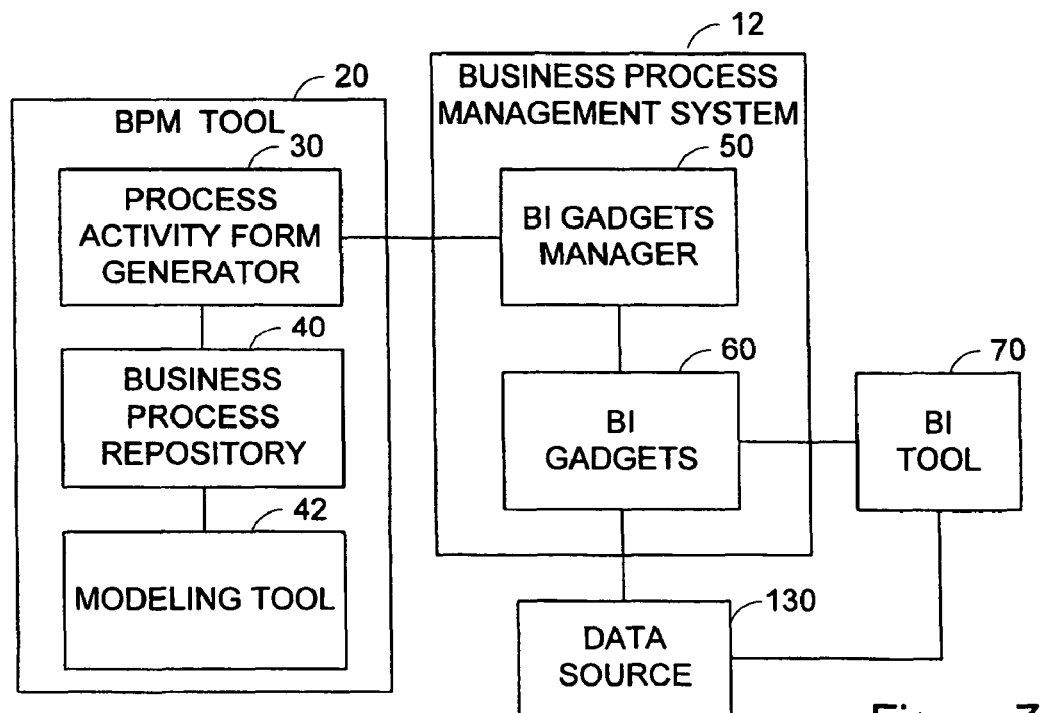
FIG. 7 is a block diagram showing a business process management system in accordance with another embodiment of the present invention.

FIG. 7 shows a business process management (BPM) system 12 in accordance with another embodiment of the invention. Similar elements to those shown in FIG. 2 are denoted with the same reference numbers for the simplicity of description.

This embodiment is suitably used when an organization has an existing BPM tool 20. The BPM system 12 may use features of the BPM tool 20. Similarly, when an organization has one or more existing BI tools 70, one or more BI gadgets 60 of the business process management system 12 may use BI features of the BI tools 70 to extract data from the data sources 130.

The BPM system 12 has a set of BI gadgets 60 and a BI gadgets manager 50. A typical BPM tool 20 has a business process repository 40, a modelling tool 42 and a business process activity form generator 30.

The business process repository 40 stores one or more business process models representing business process activities and process paths among the business process activities. It may also store business process activity forms in association with the relevant business process models. The modeling tool 42 allows a model designer to define business process models, which are stored in the business process repository 40. The business process activity form generator 30 generates business process activity forms based on the business process models in the repository 40.

The BI gadgets manager 50 of the business process management system 12 provides the BI gadgets 60 to the business process activity form generator 30 of the BPM tool 20 to enable the BI gadgets 60 to be embedded into business process activity forms based on the relevant business process models in the repository 40. Thus, the business intelligence is incorporated in the business process management that is driven by models. There is no need to write code or applications each time BI functionality is needed.

The BI gadgets manager 50 may embed BI data in proprietary business process activity forms by using a BI gadget 60 as a proxy. In this situation, the BI gadget manager 50 allows the BI gadget 60 to respond to a data request from a business process activity form and return it to the form the requested data in a known format, such as Extensible Mark-up Language (XML). The BI gadget 60 is effectively an information broker between the business process activity form and the data source 130 or a BI tool 70 accessing the data source 130. The BI gadgets manager 50 may use the context manager 54 to derive context from the business process activity form and hand it to the BI gadget 60. Based on that context, the BI gadget 60 may deliver rendered BI content or data from the data source 130 or the BI tool 70.

Thus, the BPM system 12 improves on the existing BPM tool 20 by introducing the BI gadgets 60 for navigation, search, rendering and interaction by run-time users. The BPM system 12 may also use the power of existing BI tools 70 to extract that data from data sources 130 and displaying it to the user as data embedded as part of the forms.

In a different embodiment, the business process repository 40 may be part of the BPM system 10 or 12.

In the above described embodiments, the BI gadgets 60 are embeddable within business process activity forms. When a process author or modeller is defining a business process, e.g., using a business process modeling tool 42, the BI gadgets manager 50 may add BI gadgets 60 to the process design palette. A form designer may use the BI gadgets 60 in the process design palette to design business process activity forms. Within business process activity forms, one or more appropriate embedded BI gadgets (e.g., a report) appear and are presented to the run-time user who is the process participant. Such business process activity forms may be called the "BI-enabled forms". A BI-enabled form supports run-time process path branching, i.e., the form allows the user to determine the "next" process activity. The next process activity is dependent upon the BI data or information delivered to the user in the business process activity form using the embedded BI gadgets. The BI gadgets manager 50 may record in the business process data storage 58 both the BI and the process path branch for audit and compliance purposes.

Referring back to FIG. 3, examples of BI gadgets 60 are described. BI gadgets 60 in this embodiment include a viewer gadget 61, navigation and search gadgets 62, an ad hoc query gadget 63, an analysis gadget 64, and a post analysis gadget 65. In a different embodiment, the BI management system 50 may have a different set of BI gadgets.

The viewer gadget 61 is a tool for exposing BI content or data and context inside of a business process activity form. The viewer gadget 61 may expose pre-defined BI content or context. For example, in the business process model, a form author selects a specific BI artifact that has been previously authored, and elects to embed it inside the business process activity form for runtime consumption as pre-defined BI content or context. Also, the viewer gadget 61 may generate and expose BI content or context at run-time based on the context of the particular/current in-flight process, i.e., a process currently being used. In-flight means during a cycle of the present business process incarnation. For example, in the business process model, the author selects a specific BI artifact that has been previously authored, and embeds it inside the business process activity form for runtime consumption or exploitation. Additionally, the viewer gadget 61 may set a context flag to ensure that the context of the BPM process is passed to the BI artifact so that the report or analysis is filtered dynamically based on the context at runtime.

The navigation and/or search gadgets 62 are tools for finding and/or navigating BI content from a business process activity form. The administrator, i.e., a form author, selects to include either a search gadget or a navigation gadget or both gadgets 62 inside the business process activity form by, e.g., dragging and dropping these gadgets 62 onto the form. This gadget embedding does not involve any code coding, such as Structured Query Language (SQL) or multidimensional expressions (MDX) coding by the administrator. The context of these gadgets 62 can be predefined or dynamically defined. For example, as predefined context, a form author, at design time, may defined context, such as a specific category of information for the navigation gadget, or a default search keyword for the search gadget. When the context is dynamic, these gadgets 62 allow the instance of the BPM process to set the context at runtime, or allow the user to freely navigate through the gadgets 62 to select BI artifacts from relevant information, e.g., a relevant set of categorized folders. BI context may be centralized in a common repository for security and consistency purposes. The BI context can also be used by other BI gadgets.

The ad hoc query gadget 63 is a tool for filling in input information in a business process activity form using ad hoc queries. A query may be pre-defined, e.g., in the business process model, or defined by a user at run-time. The ad hoc query gadget 63 uses business-friendly semantics, i.e., without the need to know SQL or MDX. When the run-time user defines a query, the ad hoc query gadget 63 automatically generates some of the query parameters according to the context of the in-flight process, or the context of the particular business process activity form. For example, a business process activity form may have multiple input-capture fields in which the ad hoc query gadget 63 is embedded. In that case, the user keys in a subset of those fields, and based on the data input, the ad hoc query gadget 63 generates a query and retrieves the appropriate information for the remaining fields.

The analysis gadget 64 is a tool for filling in input information in a business process activity form. An analysis may be pre-defined, e.g., in the business process model, or defined by a user at run-time. The analysis gadget 64 uses business friendly semantics, i.e., without the need to know SQL or MDX. When the run-time user defines an analysis, the analysis gadget 64 automatically generates some of the analysis parameters according to the context of the in-flight process, or the context of the particular business process activity form. The analysis gadget 64 differs from the ad hoc query gadget 63 in that typical users of the ad hoc query gadget 63 knows what they are looking for (e.g., "What is the average sales for this product across North America?"), while a typical user of the analysis gadget 64 may not know what specific information is needed, but is looking to start on a broad set of information and drill down, pivot, sort and/or calculate to find interesting information, e.g., trends and data highlights, and with each step of information discovery gain deeper knowledge.

The post analysis gadget 65 is a tool for providing a mechanism to save a "snapshot" of the BI content and context to a business process history database 80. The post analysis gadget 65 also stores decisions made, and responses to the decisions. The post analysis gadget 65 also allows users to easily navigate through BI artifacts of past decision responses to review past decisions and the supporting BI content and context that was leveraged in the decision-making process.

Embedded BI gadgets (e.g., reports, queries, searches) utilized in the course of a business process may be "save-able". The embedded BI gadgets may be recorded in the business process history database 80, along with the decision made, e.g., the course taken or process path taken, as a result of BI gadget utilization by the user or users. This recording is performed using the post analysis gadget 65. Consequently, these savable embedded BI gadgets provide two post facto capabilities: historical reporting of BI gadget process utilization in support of users' compliance agendas; and a form of knowledge management, whereby decision paths are recorded and exposed at run-time to users, so that they can have a basis for what decisions were made in the past, and based on what information at that time.

The BI gadgets 60 may have a mapping capability, i.e., the ability to translate the mapping between the contextual data in the business process activity form and the BI metadata, and to that end can formulate and run complex BI queries, and render the result set appropriately.

Figure 8:
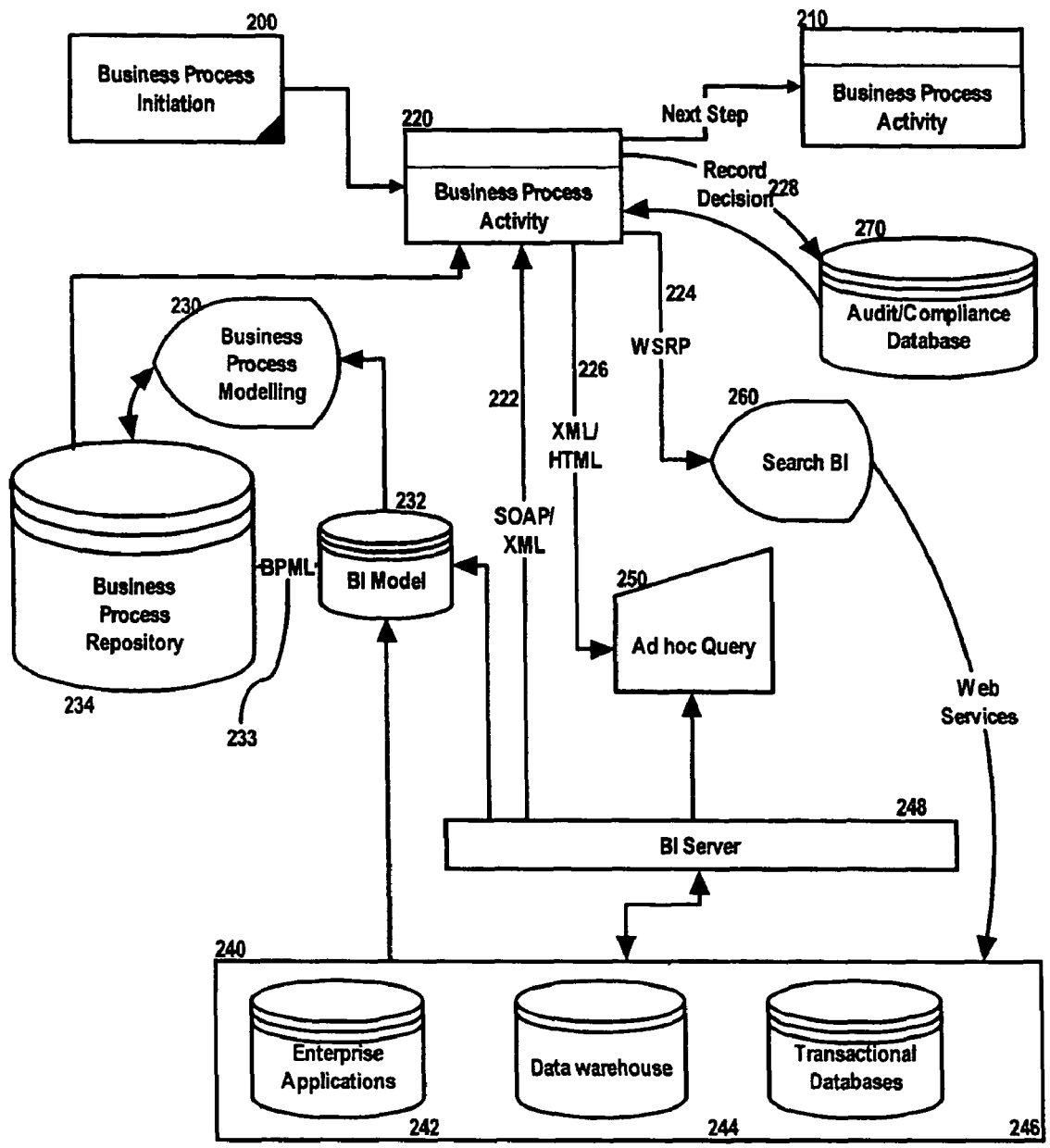
FIG. 8 is a diagram showing an example of elements interacting with a business process activity form having embedded BI gadgets.

FIG. 8 shows an example of elements interaction in relation to a business process. When a user initiates the business process 200, the BPM system 10, 12 generates a first instantiation of a business process activity form (not shown) for the first business process activity 220. The business process activity form has various BI gadgets, i.e. embedded viewer gadget 61, navigation and search gadget 62, ad hoc query gadget 63, analysis gadget 64, and post analysis gadget 65.

The embedded viewer gadget 61 is represented as the interface between the business process activity 220 and the business process activity form. The viewer gadget 61 allows the user to interact with the form.

The interface 233 between the business process repository 234 and the BI model 232, which is shown as a BI metadata model 90 in FIG. 5, represents the BI gadgets manager 50. It makes available to a business process modeller the BI content stored in the BI model 232, such as reports, report definitions, and analysis cubes. The BI gadgets manager 50 enables a business process modeller or form author to embed into the business process activity form BI gadgets 60 that are relevant to the process activity 220 and can be called up by the user who assigned the process activity 220 from inside of the business process activity form. The BI gadgets may be "clickable" and may be navigable.

BI server 248 shown in FIG. 8 is a server having various BI tools for extracting data from corporate data sources 240, including enterprise applications 242, data warehouse 244 and transactional databases 246. The interface 222 between the business process activity 220 and the BI server 248 is the real-time (run-time) complement of the interface 233. The BI content is not pre-defined, but is determined at run-time, taking into context and the status of the process, e.g., what paths were taken to get to this point, and what data values have been collected from the user.

The embedded navigation and search gadget 62 is represented as the interface 224 between the business process activity 220 and search BI 260. This is similar to the interface 222 but instead of displaying a list of relevant BI content, the navigation and search gadget 62 presents the user with a Google™-like search field. For example, the navigation and search gadget 62 brings up a list of all reports relating to search terms, e.g., Sales of Shoeware Products in the U.K. Using the navigation and search gadget 62, the user determines or finds the BI content relevant to the process activity 220.

The embedded ad hoc query gadget 63 is represented as the interface 226 between the business process activity 220 and an ad-hoc query 250. The ad hoc query gadget 63 enables the user to form own business queries from inside of the business process activity form. This is in contrast to the interfaces 233 and 222 that provide a more structured access to the information, through usually predefined queries. In the case of interface 222, it is capable of limited variability of access to the information.

The embedded analysis gadget 64 combines the functions of the navigation and search gadget 62 and ad hoc query gadget 63.

The embedded post analysis gadget 65 is represented as the interface 228 between the business process activity 220 and an audit/compliance database 270. This is an optional component used for compiling and audit the history of activity of the system. Thus, the audit/compliance database 270 is accessed to record activities, and also to permit display of previous activities.

Once the user makes a decision, i.e., fills out the business process activity form for the process activity 220, the BPM system 10, 12 brings the business process to the next business process activity 210 and generates a business process activity form associated with the process activity 210.

The following scenarios illustrate examples of the use of business process activity forms with embedded BI gadgets.

Consider a company that has a large number of products to sell. The company has implemented a business process management (BPM) system that can improve the customer order process. The following scenario illustrates how business intelligence (BI) is incorporated within such a BPM system.

One common process activity for selling products is where an agent needs to offer an attractive discount for a customer. The company has already provided an intelligent discounting tool, Step Processor, based on current inventory levels of the product and type of customer. The following sequence of actions is carried out by the sales agent within a business process activity form generated by the BPM system. The business process activity form has an embedded viewer gadget 61, search gadget 62, analysis gadget 64 and ad hoc query gadget 63.

Figure 9:
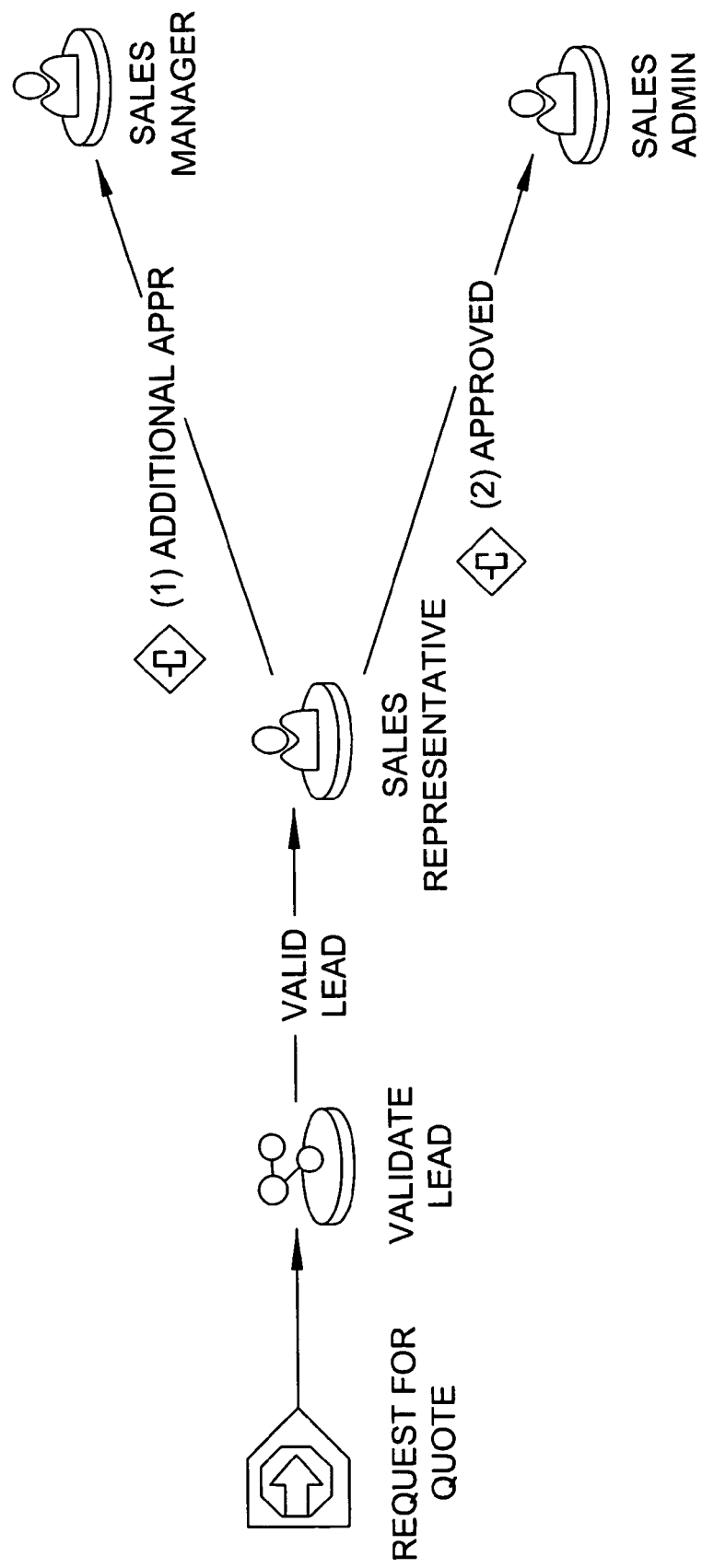
FIG. 9 is a schematic diagram showing an example of a sequence of actions taken by a run-time user of a business process activity form.
Figure 11:
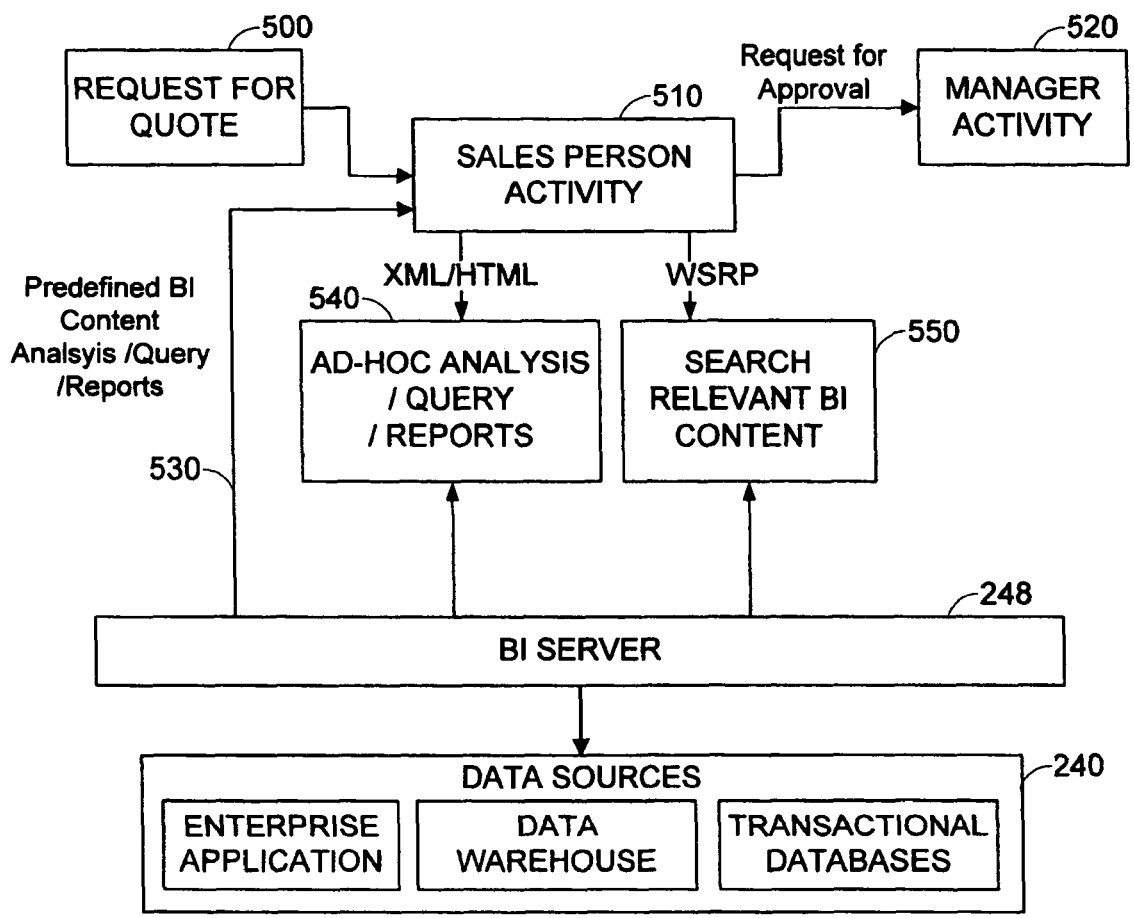
FIG. 11 is a diagram showing another example of elements interacting with a business process activity form having embedded BI gadgets.

FIG. 9 schematically illustrates the sequence of the actions for a request-for-quote workflow process. FIG. 11 shows interactions of components during the process.

Figure 10:
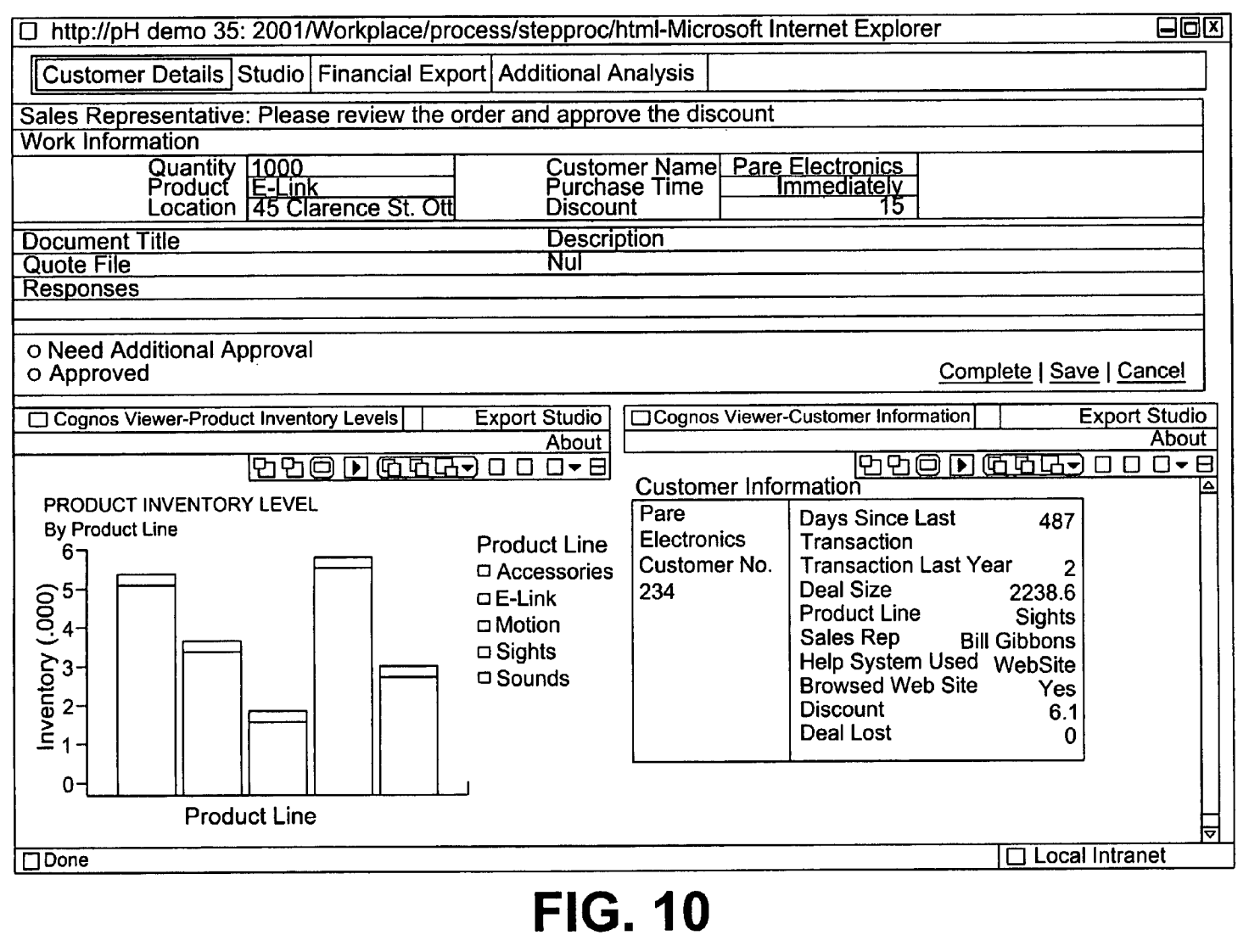

At 500, a request for quote (RFQ) form which is a business process activity form is filled out by the customer, which automatically initiates the RFQ workflow process. At 510, when the sales agent opens the Step Processor, the sales agent receives the request for quote from the customer in his work inbox within a portal environment. FIG. 10 shows an example of a Step Process interface. On the first tab are the details of the customer which are pulled up automatically from the workflow data fields through the embedded viewer gadget 61.

Within the quote form, the agent is automatically presented (530) through the embedded viewer gadget 61 with reports retrieved from a repository of the BI server 248. The reports show the current inventory levels of the products (Report that appears on the bottom-left on FIG. 10), the customer information (Report on bottom-right pane on FIG. 10), and possible discount scenarios. Other workflow data fields contain the information for retrieving the reports from the BI server 248. The data fields are in the form of String arrays which contain information {<Package Name>, <Folder Name>, <Report Name>}. These values are parsed and passed as parameters in a call that retrieves the corresponding reports from the data source 240.

The sales agent needs to make the quota for the quarter and this order is very critical to achieving that goal. The agent wants to give an attractive discount for the customer, which is beyond the recommended discounts on the form. In order to offer additional discount, the agent needs to understand the credit rating of the customer, determine if this customer is profitable, and possibly look at past decisions that have been made. To this end, the sales agent types in the discount into the Step Processor data field called "Discount." The value of that data field gets written back to the work item by the BPM system. The work item gets dispatched onto the next step.

The search gadget 62 is embedded in a second tab in the Step Processor. The agent uses the embedded search gadget 62 to find the customer credit rating, the payment terms and payment history, and other Business Intelligence information. The embedded search gadget 62 passes a package name relating to the requested information into the second tab and used as context to present the agent with a search screen with the correct package already opened up (550).

The embedded search gadget 62 obtains the relevant information not only from the data in the transactional system, but also from many data assets utilized within the company including data warehouses, and other modern and local data sources (XML, Excel, etc).

The sales agent may also conduct some analysis on this data (540), using the embedded analysis gadget 64, to see how this customer compares to others, how the customer activity has averaged over time or in comparison to industry benchmarks, etc. With this information and newly formed knowledge, the sales agent is ready to fill the form to offer the additional discount. This additional information may be consolidated into a report that is saved on the BI server 248 and linked into the step processor and/or saved as a document that is added to the form as a workflow attachment.

Since the additional discount being offered is beyond the standard policy, the sales agent is required to fill in extra information in the business process activity form. The sales agent picks the reason for further discounting as "good credit score". The embedded BI gadgets automatically fills the fields like the payment history, and external agency scoring for that customer.

Further, the sales agent wants to make sure that the case for additional discount is solid when it comes to the manager for approval. The agent decides to fill in extra information fields with historical discount percentage offered to this customer. The sales agent in the business process activity form clicks on the embedded ad hoc query gadget 63 and creates a customer discount history query using the business semantics and fills in the extra information field (540). With all this data filled in, the sales agent submits with great confidence the quote activity form to the next step for approval from the manager at 520.

In a second example, a company has plans to expand into new regions, where it requires local offices. The company has implemented a business process management system to support optimal location identification that includes such activities as: "consider regional financial projections", "elicit regional political data and economic forecasts", "determine timeline and resource requirements for product localization", and "determine local support resource availability".

Consider the process activity where a researcher needs to determine, and potentially adjust, timeline and resource requirements for product localization. Thus, the following sequence of actions is carried out by the researcher within a business process activity form. The business process activity form has an embedded viewer gadget 61, search gadget 62, analysis gadget 64 and ad hoc query gadget 63.

The researcher receives a Process activity notification. After clicking on the notification, the researcher is presented with the business process activity form that has a pre-defined (at process design time) BI report viewer. The report shows the timelines and planned resources for localizing the company's products for various regions.

The researcher runs a BI report on market projections for each of the candidate locations using embedded analysis gadget 64. Noting that Dubai is at the top for new, untapped markets; and referring to the report that Dubai localization is planned for 18 months out, the researcher invokes the ad hoc query gadget 63 and creates a query of local third party support resources, such as availability and skill level, that may be utilized for product localization.

The researcher clicks on a button in the business process activity form to recommend to the product manager that the timeline and resources be adjusted/accelerated for accommodating a 6-month product localization target for Dubai. The business process activity form is passed on to the product manager for action, together with the report and query results from the process activity.

As demonstrated in the above examples, there are numerous scenarios similar to the above-described scenarios can be identified within an organization. Generalizing these process activities, the BPM system 10, 12 uses BI gadgets to permit the automated incorporation of BI within BPM to support management processes.

As described above, the business process management system 10, 12 allows non-software-developers to embed BI gadgets business process activity forms so that run-time users, e.g., managers without programming skills, can receive in-context and in-place or in form reports and analysis. Thus, up-to-date BI can be embedded directly inside of the business process management workflow. The business process management system 10, 12 also allows the placing of appropriate navigation controls or gadgets to allow users to select from pertinent BI content. Thus, administrators and users can embed, leverage, and exploit Business Intelligence data without knowledge of SQL or MDX. Management activities and decisions can be tracked and recorded, thus improving management performance, communications, and compliance. The business process management system 10, 12 can constitute a "system of record" upon completion of the decision.

The business process management system 10, 12 can also address the "information overload" problem that many managers face. The business process management system 10, 12 can deliver BI to managers in the context of business processes, i.e., the right information to the right user at the right time. In some cases the administrator, in setting up the form, elects to provide the user with a navigation option to select from a series of Business Intelligence artifacts that are derived from or directly based on the enterprise databases using the functions of the business intelligence tools suite.

The business process management system 10, 12 may automatically provide the user with 'secured' content, gaining access to appropriate reports and analysis. Context can be passed from the BPM process to the BI artifact, e.g., the report, the analysis, and the navigation control, in order to improve the efficiency of the user as well as the administrator who can create dynamic content, which adjusts for various BPM conditions.

The business process management system enables Business Intelligence to be embedded within business processes to support management participation and run-time decision-making based on near real time or business real time data. The information leading to the decision, and more specifically the Business Intelligence used as part of a management decision, can be captured for historic reference, such as audit or compliance and also to assist in process improvement.

The business process management system may be conveniently embodied in an executable or loadable software package, which may be transmitted over data links, or stored on a computer readable medium, for ease of installation on appropriately configured computers.

The business process management system of the invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the business process management system are described separately, however, two or more elements may be provided as a single element, or one or more elements may be shared with other components in one or more computer systems.

What is claimed is:

1. A computer-implemented method of generating business intelligence incorporated business process activity forms, the method comprising configuring one or more computer processors to perform an operation comprising:

providing a set of business intelligence (BI) gadgets, each BI gadget comprising a distinct application that provides a predefined functionality for extracting data from one or more data sources storing BI data of an organization; and generating, by operation of the one or more computer processors, a business process activity form representing a business process activity in response to a request from a user for the business process activity form, wherein the business process activity form comprises a plurality of form fields, and wherein generating the business process activity form comprises:

embedding one or more of the BI gadgets automatically and dynamically into the business process activity form for allowing access to the predefined functionality of the embedded one or more of the BI gadgets from the business process activity form; and extracting, by the embedded one or more of the BI gadgets, data from the one or more data sources to at least a first form field of the plurality of form fields to guide the user in providing a business decision for the business process activity as input to at least a second form field of the plurality of form fields of the business process activity form.

2. The method as claimed in claim 1, wherein the operation further comprises:

dynamically updating the business process activity form according to the functionalities provided by the embedded one or more of the BI gadgets.

3. The method as claimed in claim 1, wherein the operation further comprises:

extracting context from the business process activity form; and providing the extracted context to the embedded one or more of the BI gadgets to allow the embedded one or more of the BI gadgets to extract data from the one or more data sources based on the extracted context.

4. The method as claimed in claim 1, wherein the operation further comprises:

storing business process data including BI content and context of the business process activity form together with actions taken in the business process activity form.

5. The method as claimed in claim 1, wherein the providing a set of BI gadgets exposes the set of BI gadgets for use by a business process activity form generator to generate the business process activity form and embed automatically and dynamically the one or more of the BI gadgets into the business process activity form.

6. The method as claimed in claim 1, wherein the operation further comprises:
   providing a palette of the set of BI gadgets, during designing of the business process activity form, to allow selection of the one or more of the BI gadgets to be used in the business process activity form,
   wherein the embedding one or more of the BI gadgets embeds at runtime the one or more of the BI gadgets selected during the designing of the business process activity form.

7. The method as claimed in claim 1, wherein the embedding one or more of the BI gadgets embeds a viewer gadget that exposes BI content or context inside the business process activity form.

8. The method as claimed in claim 7, wherein the embedded viewer gadget exposes predefined BI content or context, or generates and exposes BI content or context at run-time based on context of an in-flight process represented by the business process activity form.

9. The method as claimed in claim 1, wherein the embedding one or more of the BI gadgets embeds a navigation or search gadget that allows navigating or searching BI content from the business process activity form.

10. The method as claimed in claim 9, wherein the embedded navigation or search gadget has predefined context for navigating or searching, or context dynamically defined at runtime.

11. The method as claimed in claim 1, wherein the embedding one or more of the BI gadgets embeds an ad hoc query gadget that fills in input information in the business process activity form using ad hoc queries.

12. The method as claimed in claim 11, wherein the embedded ad hoc query gadget has a predefined query, or uses a query defined at runtime.

13. The method as claimed in claim 12, wherein the operation further comprises, for the embedded ad hoc query gadget using a query defined at runtime, automatically generating one or more query parameters according to context of an in-flight process represented by the business process activity form or context of the business process activity form.

14. The method as claimed in claim 1, wherein the embedding one or more of the BI gadgets embeds an analysis gadget that fills in input information in the business process activity form using an analysis of data.

15. The method as claimed in claim 14, wherein the embedded analysis gadget performs a predefined analysis, or an analysis defined at runtime.

16. The method as claimed in claim 15, wherein the operation further comprises, for the embedded analysis gadget performs an analysis defined at runtime, automatically generating one or more query parameters according to context of an in-flight process represented by the business process activity form or context of the business process activity form.

17. The method as claimed in claim 1, wherein the embedding one or more of the BI gadgets embeds a post analysis gadget that saves a snapshot of BI content and context to a business process history database, and analyzes data in the business process history database.

18. The method as claimed in claim 1, wherein the embedding one or more of the BI gadgets embeds a BI gadget as a proxy to use an existing BI tool to extract data from the one or more data sources.

19. The method as claimed in claim 1, wherein the generating a business process activity form generates the business process activity form that supports run-time process path branching depending on the data extracted using the embedded one or more of the BI gadgets.

20. A computer readable storage medium storing instructions and/or statements for use in the execution in a computer of a method of generating business intelligence incorporated business process activity forms, the method comprising the steps of:
   providing a set of business intelligence (BI) gadgets, each BI gadget comprising a distinct application that provides a predefined functionality for extracting data from one or more data sources storing BI data of an organization; and
   generating a business process activity form representing a business process activity in response to a request from a user for the business process activity form, wherein the business process activity form comprises a plurality of form fields, and wherein generating the business process activity form comprises:
      embedding one or more of the BI gadgets automatically and dynamically into the business process activity form for allowing access to the predefined functionality of the embedded one or more of the BI gadgets from the business process activity form; and
      extracting, by the embedded one or more of the BI gadgets, data from the one or more data sources to at least a first form field of the plurality of form fields to guide the user in providing a business decision for the business process activity as input to at least a second form field of the plurality of form fields of the business process activity form.

21. The computer readable storage medium as claimed in claim 20, wherein the method further comprises:
   dynamically updating the business process activity form according to the functionalities provided by the embedded one or more of the BI gadgets.

22. The computer readable storage medium as claimed in claim 20, wherein the method further comprises:
   extracting context from the business process activity form; and providing the extracted context to the embedded one or more of the BI gadgets to allow the embedded one or more of the BI gadgets to extract data from the one or more data sources based on the extracted context.

23. A business process management system for generating business intelligence incorporated business process activity forms, the business process management system comprising:
   one or more computer processors;
   a set of business intelligence (BI) gadgets, each BI gadget comprising a distinct application that provides a predefined functionality for extracting data from one or more data sources storing BI data of an organization;
   a BI gadgets manager for enabling embedment of one or more of the BI gadgets into the business process activity forms; and
   a business process activity form generator for generating, by operation of the one or more computer processors, a business process activity form for presenting a user relevant data for a business process activity represented by the business process activity form, wherein the business process activity form comprises a plurality of form fields, and wherein the business process activity form generator is configured for:
      embedding, via the BI gadgets manager, one or more of the BI gadgets into the business process activity form for allowing access to the predefined functionality of the embedded one or more of the BI gadgets from the business process activity form; and
      extracting, by the embedded one or more of the BI gadgets, data from the one or more data sources to at least a first form field of the plurality of form fields to guide the user in providing a business decision for the business process activity as input to at least a second form field of the plurality of form fields of the business process activity form.

24. The business process management system as claimed in claim 23, wherein the embedded one or more BI gadgets dynamically update the business process activity form according to the functionalities provided by the embedded one or more of the BI gadgets.

25. A computer-implemented method of generating business intelligence incorporated business process activity forms, the method comprising configuring one or more computer processors to perform an operation comprising:

providing a business process activity form generator for generating a business process activity form for presenting a user relevant data for a business process activity represented by the business process activity form, wherein the business process activity form comprises a plurality of form fields, wherein the business process activity form generator comprises a form designing tool for designing the business process activity form, and wherein the form designing tool comprises a process design palette for presenting available tools for designing the business process activity form;

providing a BI gadgets manager comprising a BI gadgets provider for exposing a set of business intelligence (BI) gadgets to the process activity form generator, each BI gadget comprising a distinct application that provides a predefined functionality for extracting data from one or more data sources storing BI data of an organization;

adding, by the BI gadgets manager, the set of BI gadgets to the process design palette;

receiving, by the form designing tool, user input selecting one or more of the BI gadgets on the process design palette for inclusion on the business process activity form; and generating the business process activity form by operation of the one or more computer processors based on the received user input.

26. The computer-implemented method of claim 25, wherein generating the business process activity form comprises:

embedding the selected one or more of the BI gadgets into the business process activity form for allowing access to the predefined functionality of the embedded one or more of the BI gadgets from the business process activity form; and extracting, by the embedded one or more of the BI gadgets, data from the one or more data sources to at least a first form field of the plurality of form fields to guide the user in providing a business decision for the business process activity as input to at least a second form field of the plurality of form fields of the business process activity form.

* * * * *